J. W. FARNOFF.
DEMOUNTABLE RIM FOR WHEELS.
APPLICATION FILED AUG. 29, 1910.
981,181.
Patented Jan. 10, 1911.
3 SHEETS—SHEET 2.
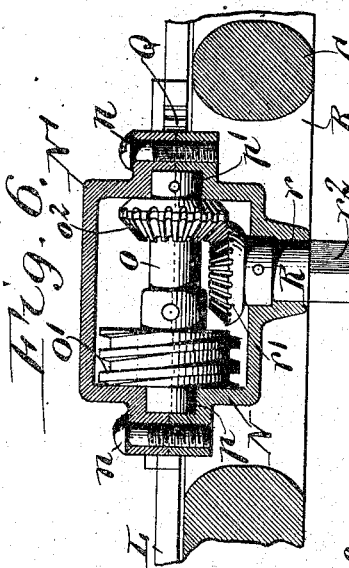
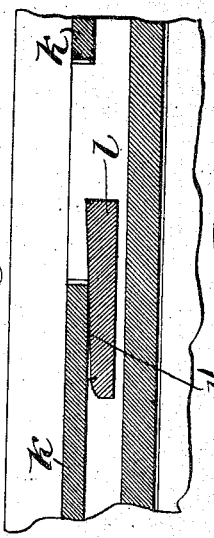
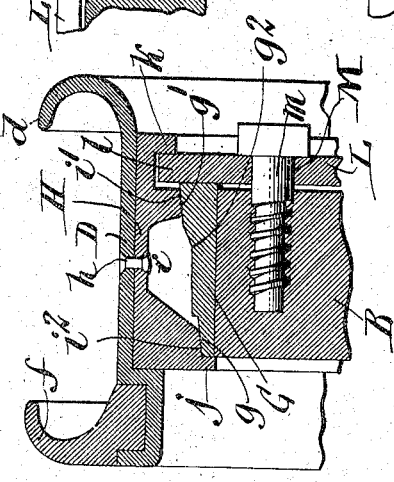
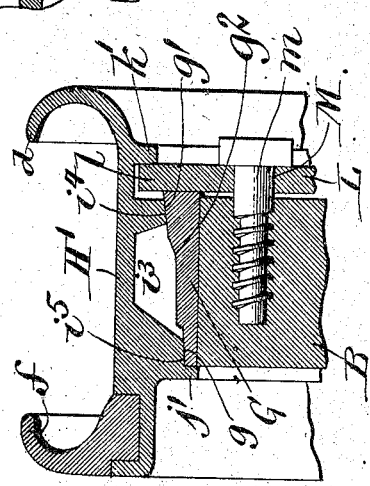
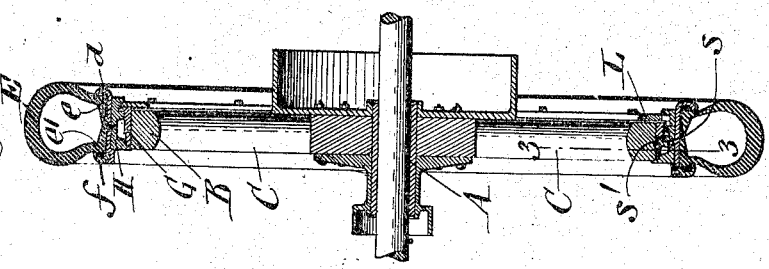
Witnesses:—
Alfred Birkenhagen.
Anna Hugis.
Inventor
Jay W. Farnoff
by Geyer & Popp
Attorneys

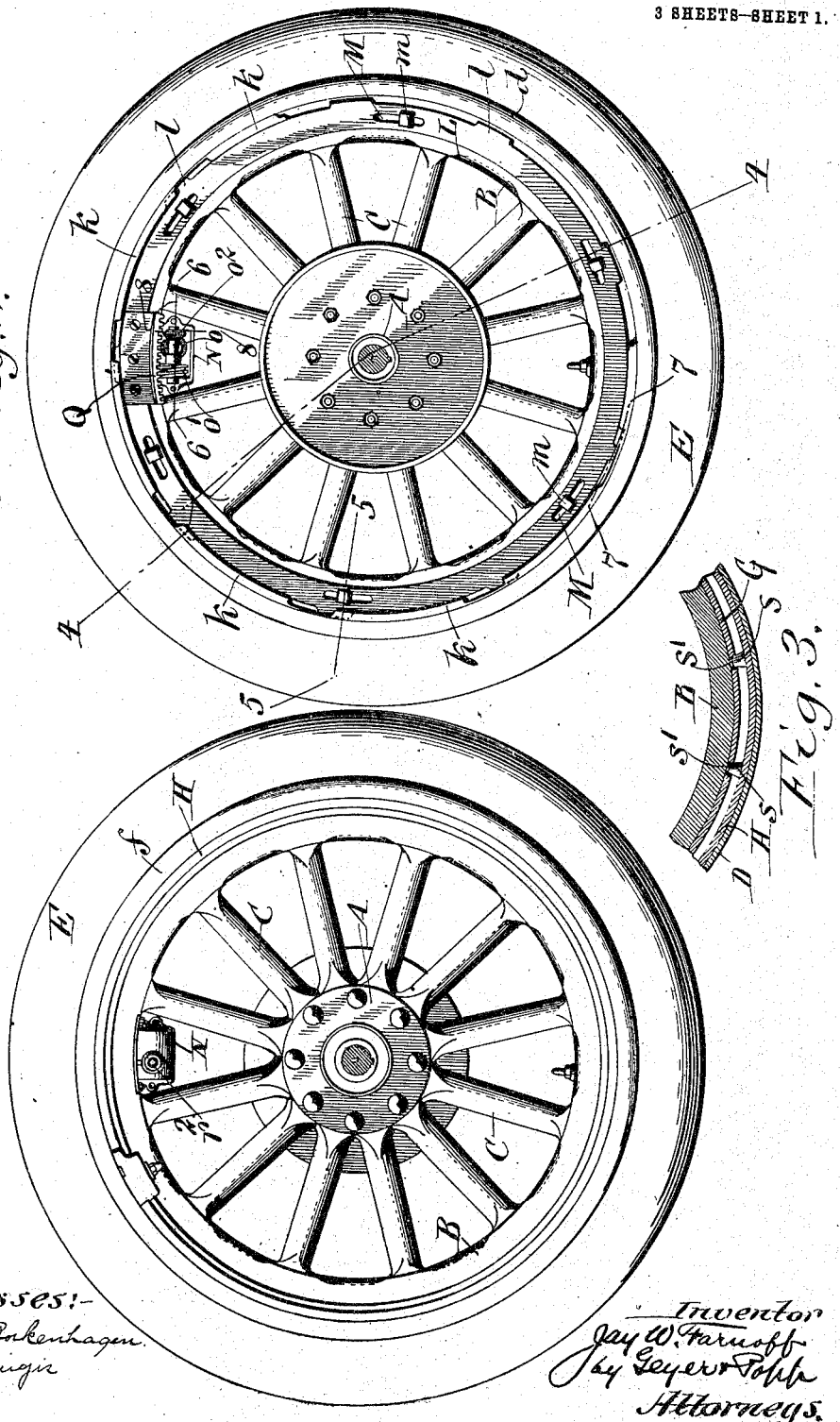

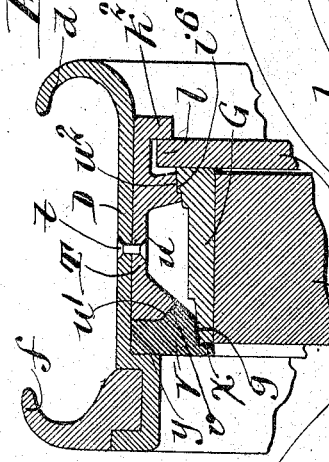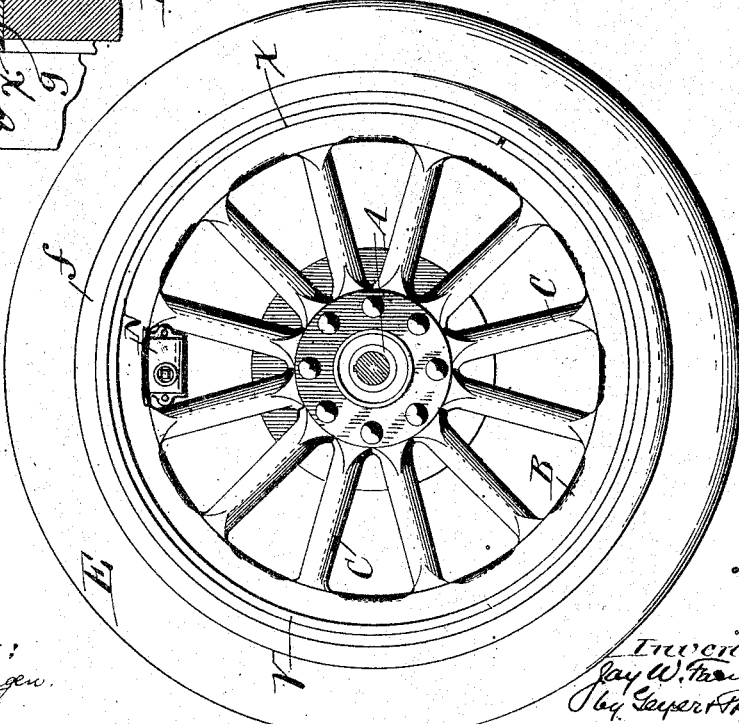

UNITED STATES PATENT OFFICE.

JAY W. FARNOFF, OF BUFFALO, NEW YORK, ASSIGNOR OF ONE-HALF TO WALTER J. REIMAN, OF BUFFALO, NEW YORK.

DEMOUNTABLE RIM FOR WHEELS.

981,181.  Specification of Letters Patent.  Patented Jan. 10, 1911.

Application filed August 29, 1910. Serial No. 579,501.

*To all whom it may concern:*

Be it known that I, JAY W. FARNOFF, a citizen of the United States, residing at Buffalo, in the county of Erie and State of New York, have invented new and useful Improvements in Demountable Rims for Wheels, of which the following is a specification.

This invention relates to a wheel having a demountable rim which is adapted to carry an inflated tire and permit of attaching this tire in its inflated condition to the wheel.

It is the object of this invention to provide improved means for attaching the demountable rim to or detaching the same from the wheel, which means are simple in construction, more easily manipulated and hold the rim more reliably in place.

In the accompanying drawings consisting of 3 sheets: Figure 1 is an outside elevation of a wheel showing one form of my improved means for demountably attaching the tire thereto. Fig. 2 is a similar view of the same viewed from the inner side with part of the outer bearing ring broken away and showing part of the housing removed which incloses the shifting mechanism of the locking ring. Fig. 3 is a fragmentary section in line 3—3, Fig. 4. Fig. 4 is a vertical transverse section in line 4—4, Fig. 2. Fig. 5 is a fragmentary cross section, on an enlarged scale, in the correspondingly numbered line in Fig. 2. Fig. 6 is a fragmentary section, on an enlarged scale, taken in line 6—6, Fig. 2 looking outwardly. Fig. 7 is a fragmentary section, on an enlarged scale, in line 7—7, looking outwardly. Fig. 8 is a fragmentary section, on an enlarged scale, in line 8—8, Fig. 2. Fig. 9 is a fragmentary section, similar to Fig. 5, and showing a modified construction of the demountable rim. Fig. 10 is a side elevation, similar to Fig. 1, showing a modification of my invention. Fig. 11 is an elevation thereof viewed from the opposite side. Fig. 12 is a fragmentary cross section, on an enlarged scale, in line 12—12, Fig. 11.

Similar letters of reference indicate corresponding parts throughout the several views.

Although my invention is applicable to wheels of various forms that shown in the drawings comprises a hub A, a felly B and a plurality of radial spokes C connecting the hub and felly. The demountable or supplemental rim may also be variously constructed but preferably comprises a cylindrical body D, a fixed hook-shaped retaining flange $d$ arranged at one edge of the body and adapted to engage with the bead $e$ on one side of the tire E and a detachable hook-shaped retaining flange $f$ arranged on the opposite edge of the body D and adapted to engage with the bead $e^1$ on the other side of said tire.

The means which are shown in Figs. 1–7 for detachably connecting the demountable rim and wheel and which embody one form of my invention are constructed as follows: G represents an inner bearing ring which is secured to the periphery of the wheel felly and which has its inner side or bore constructed of cylindrical form while its outer side is constructed generally of tapering or conical form and provided with a low conical face $g$ adjacent to the outer side of the wheel, a high conical face $g^1$ adjacent to the inner side of the wheel, and a depressed face $g^2$ between these two conical faces. To the inner side or bore of the demountable rim is secured by means of rivet $h$ or otherwise, an outer bearing rim H the outer side of which is cylindrical and fits the bore of the demountable rim while its bore is constructed to form an annular channel or depressed surface $i$, a low tapering or conical face $i^1$ arranged at the inner side of said channel, a high tapering or conical face $i^2$ arranged at the outer side of said channel, an annular stop flange or shoulder $j$ arranged at the outer side of said high conical face and projecting inwardly therefrom, and a set or plurality of outer locking lugs $k$ projecting inwardly from the outer bearing ring at the inner edge thereof but separated from the adjacent low conical face of said ring by an intervening locking space. In the assembled condition of the parts, the low bearing face of the outer bearing ring bears against the high face of the inner bearing ring and the high conical face of the outer bearing ring engages with the lower face of the inner bearing ring, the parts being thus assembled by slipping the demountable rim inwardly with its bearing ring over the bearing ring of the felly. This inward movement of the demountable rim is limited by the coöperation of the inclined or conical faces of the bearing rings on the demountable rim and the felly and also by engagement of the outer stop flange *j* with the outer edge of the inner bearing ring. In this assembled position of the parts the central opposing areas of the inner and outer bearing ring do not engage with each other owing to the depression in the central parts of the inner bearing ring and the depression in the central part of the outer bearing ring, thereby confining the actual contact between these bearing rings to the conical edge portions thereof, whereby the tendency of these parts to stick together, due to rusting and difficulty of separating them, which otherwise would occur, is avoided.

After the demountable rim has been slipped upon the wheel together with the inflated tire thereon this rim is locked against removal by means of a locking device of which the lugs *k* form a part and of which the remaining parts are constructed as follows: L represents a locking ring mounted on the inner side of the wheel felly so as to be capable of a limited rotary movement thereon but held against lateral displacement relatively to the wheel. The preferred means for thus guiding or mounting the locking ring on the wheel felly, which is shown in Figs. 2, 4, 5, 6, 7 and 8, comprises a plurality of guide screws *m* each of which is arranged in a segmental concentric slot M formed in the locking ring and engaging its threaded end with the felly while its head bears against the locking ring and holds the same against the adjacent edge of the inner bearing ring. At its outer edge the locking ring is provided with a set or plurality of locking lugs *l* which are adapted to coöperate with the outer set of locking lugs *k* of the outer bearing ring for the purpose of holding the tire and its demountable rim against removal from the wheel. When assembling the demountable rim and wheel the locking ring is so placed that its locking lugs *l* are in line with the spaces between the locking lugs *k* of the demountable rim in which position of the parts the demountable rim may be slipped over the bearing ring of the wheel and its locking lugs passed through the spaces between the locking lugs of the locking ring. After the parts have been thus assembled the locking ring is turned on the wheel so that its locking lugs pass behind the locking lugs of the demountable rim, thereby preventing separation of the demountable rim from the wheel. In order to produce a binding or wedge action of the coöperating locking lugs against each other the coöperating surfaces of these lugs are arranged at an angle to each other, this being preferably effected by inclining the working face $l^1$ of the locking lugs on the ring, as shown in Fig. 7. As the lugs of the locking ring engage with the working surfaces of the locking lugs on the outer bearing ring, a wedge action is produced which operates to draw the demountable rim tightly upon the wheel and prevent the parts from rattling when in use. A reverse movement of the locking ring withdraws its locking lugs from behind the locking lugs of the demountable rim so as to permit of removing the rim and the tire carried thereby from the wheel. This oscillating or rotating movement of the locking ring for locking or unlocking the demountable rim may be effected by various means but preferably by the shifting mechanism which is shown in Figs. 1, 2, 6 and 8 and which is constructed as follows: On the inner side of the felly is arranged a gear casing composed of a stationary section N which is secured directly to the inner side of the felly and a detachable section $N^1$ which is secured to the fixed casing section by means of screws *n*, the division between these two sections being vertical and lengthwise of the periphery of the wheel. Arranged lengthwise in this casing is a longitudinal worm shaft *o* which is provided at one end with a worm $o^1$ and at its opposite end with a driven bevel or miter gear wheel $o^2$. Said shaft together with its worm and bevel wheel are journaled within the casing by engaging that end of the shaft adjacent to its worm with a bearing *p* which is formed between the opposing adjacent parts of the casing sections, while the hub of the bevel wheel $o^2$ at the opposite ends of this shaft is journaled in a bearing $p^1$ formed between the opposing sides of the adjacent parts of the casing sections, as shown in Fig. 6. The worm and driven bevel wheel are both arranged within the casing and bear against opposite ends of the same, thereby holding the worm shaft and the parts carried thereby against axial movement within the casing. The worm engages on its outer side with a segmental gear rack Q which is secured to the locking ring at the inner edge thereof and projects inwardly through a longitudinal slot *q* formed between the casing sections. R represents an operating shaft journaled in a bearing *r* in the stationary section of the casing at right angles to the worm shaft and preferably parallel with the axis of the wheel and provided within the casing with a driving bevel wheel $r^1$ which meshes with the bevel wheel on the worm shaft while its outer end $r^2$ projects beyond the casing and is squared or otherwise constructed to receive a handle for turning the operating shaft by hand. Upon turning the operating shaft this movement is transmitted by the intermeshing bevel wheels to the worm shaft and worm, thereby causing the gear rack which meshes with the worm and the locking ring connected with the gear rack to be moved circumferentially on the wheel either into its operative or into its inoperative position. Inasmuch as the gear rack is incapable of turning the worm no separate means are required for holding the locking ring in its adjusted position.

Instead of making the outer bearing ring separate from the demountable rim, as shown in Figs. 1–5, the surfaces carried by this rim may be formed integrally thereon, as shown in Fig. 9 in which the receding central surface or channel $i^3$, the inner low conical face $i^4$, the outer high conical face $i^5$, the outer stop flange $j^1$ and the inner locking lugs $k^1$ are formed integrally with the body $H^1$ of the demountable rim. The first described construction is particularly adapted for applying my invention to wheels which are already in use while the last mentioned embodiment of my invention is applicable to wheels while the same are being made.

In order to prevent the demountable rim from turning with reference to the wheel, the inner bearing ring is provided within its channel with one or more dowels or pins $s$ which engage with sockets $s^1$ in the periphery of the inner bearing ring, as shown in Figs. 3 and 4. These dowels and sockets are arranged only on one side of the wheel and demountable rim and preferably opposite to the gearing which shifts the locking ring. For the purpose of engaging or disengaging the dowel pins and sockets the demountable rim is tilted with reference to the wheel. By depressing or hollowing the central part of the inner bearing ring between the conical bearing surfaces on opposite sides of said central part sufficient clearance is provided to permit the rim to be tilted in the manner described without interference between the same.

In the modified construction of my invention shown in Figs. 10–12 a plurality of separate bearing blocks or sections T are secured at intervals by means of rivets $t$ or otherwise to the inner side of the demountable rim. Each of these blocks is provided centrally on its bore with a depressed surface or channel $u$, an inclined seat $u^1$ at its outer edge, a low conical face $u^2$ on its inner edge which is adapted to engage with the high conical face $i^6$ on the inner bearing ring and an inwardly projecting locking lug $k^2$ at its inner edge which is engaged by a locking lug $l$ of the locking ring L.

For the purpose of a filling the space between the outer parts of the demountable rim and wheel and support these parts reliably upon each other a split wedge-shaped filling ring V is provided which bears at its periphery against the bore of the demountable rim while its bore is of conical form and bears against the low conical face $g$ of the inner bearing ring. On its inner side the filling ring is provided with an inclined shoulder $v$ engaging with the corresponding shoulder $u^1$ on the adjacent end of the blocks T. The filling ring is also provided on its outer side adjacent to its bore with a stop flange or shoulder $x$ which bears against the outer side of the wheel felly and it is held against displacement by engagement of the shoulder $y$ on the demountable rim with the outer side of the filling ring, as shown in Fig. 12.

I claim as my invention:

The combination of a wheel having its felly provided with a bearing face, a tire supporting rim provided with a bearing face engaging with that of said felly and also provided with a set of locking lugs, a locking ring rotatable on the felly and provided with a set of locking lugs adapted to engage with the lugs of the rim, and means for turning said ring into and out of its operative position comprising a gear rack arranged on said ring, a worm shaft journaled in bearings on the felly and provided with a worm engaging with said gear rack and also provided with a bevel wheel and an operating shaft journaled in a bearing on the felly and provided with a bevel wheel meshing with the bevel wheel on said worm shaft.

Witness my hand this 27th day of August, 1910.

JAY W. FARNOFF.

Witnesses:
WALTER J. REIMAN,
THEO. L. POPP.